United States Patent
Wagner et al.

(10) Patent No.: US 7,129,598 B2
(45) Date of Patent: Oct. 31, 2006

(54) SAFETY SWITCH FOR PREVENTING AN UNINTENTIONAL VEHICLE BATTERY DISCHARGE

(75) Inventors: Armin Wagner, Karlsfeld (DE); Oliver Froelich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/729,381

(22) Filed: Dec. 8, 2003

(65) Prior Publication Data

US 2004/0169419 A1    Sep. 2, 2004

Related U.S. Application Data

(63) Continuation of application No. PCT/EP02/02946, filed on Mar. 16, 2002.

(30) Foreign Application Priority Data

Jun. 9, 2001 (DE) ................. 101 28 136

(51) Int. Cl.
  *H02H 7/18* (2006.01)
(52) U.S. Cl. .................................... 307/10.7
(58) Field of Classification Search ................. 307/10.7
  See application file for complete search history.

(56) References Cited

U.S. PATENT DOCUMENTS

| | | | |
|---|---|---|---|
| 4,218,717 A * | 8/1980 | Shuster | ........................ 361/79 |
| 5,159,257 A | 10/1992 | Oka et al. | |
| 5,200,877 A | 4/1993 | Betton et al. | |
| 5,272,380 A * | 12/1993 | Clokie | ........................ 307/10.7 |
| 5,272,386 A | 12/1993 | Kephart | |
| 5,332,958 A | 7/1994 | Sloan | |
| 5,977,751 A * | 11/1999 | Blessing et al. | ............. 320/134 |
| 6,646,845 B1 * | 11/2003 | Turner et al. | .................. 361/86 |

FOREIGN PATENT DOCUMENTS

| | | |
|---|---|---|
| DE | 38 41 769 C1 | 12/1988 |
| DE | 296 07 780 U1 | 4/1996 |
| DE | 195 48 612 A1 | 6/1997 |
| DE | 197 06 946 C2 | 8/1998 |
| DE | 299 07 587 U1 | 4/1999 |
| DE | 199 57 477 A1 | 5/2001 |
| EP | 0 601 333 B1 | 11/1993 |

OTHER PUBLICATIONS

"The Impact of the Automotive Environment on Power Semiconductors", Randy Frank and Richard Valentine, IEEE, 1989, pp. 84-88.

* cited by examiner

Primary Examiner—Robert L. Deberadinis
(74) Attorney, Agent, or Firm—Crowell & Moring LLP

(57) ABSTRACT

A vehicle electric supply system includes a semiconductor safety switch that interruptibly couples the vehicle battery to electric consuming devices that are supplied by an electric socket on board the vehicle. A programmable control unit controls opening and closing of the switch, as a function of a monitored vehicle parameter, such as elapsed time, battery charge state or current consumption via the vehicle socket.

2 Claims, 1 Drawing Sheet

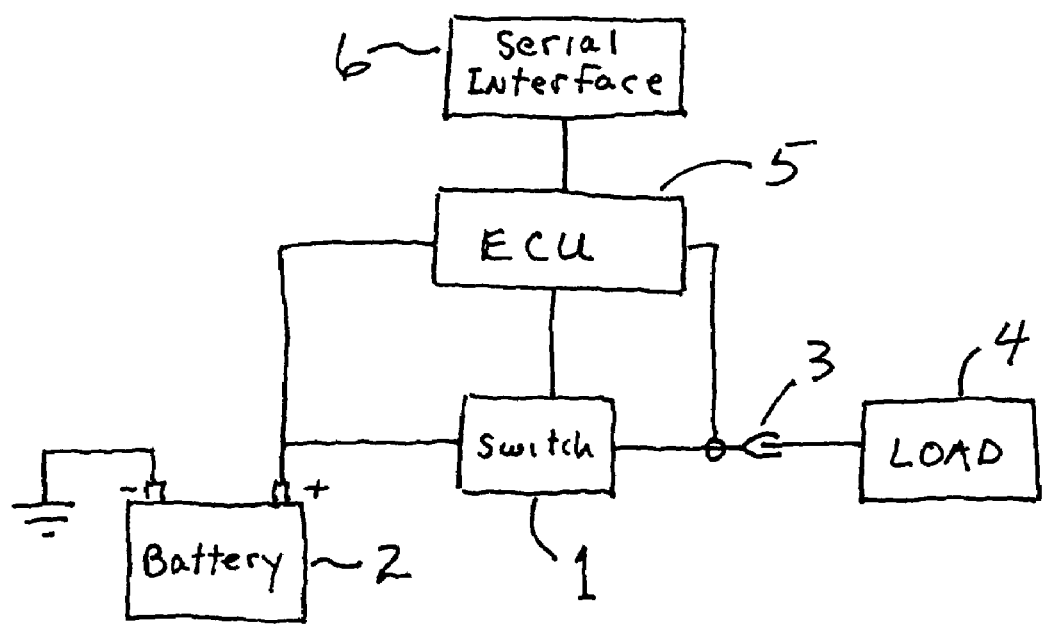

SAFETY SWITCH FOR PREVENTING AN UNINTENTIONAL VEHICLE BATTERY DISCHARGE

CROSS-REFERENCE TO RELATED APPLICATIONS

This application is a continuation of PCT Application No. PCT/EP02/02946, filed on 16 Mar. 2002.

BACKGROUND AND SUMMARY OF THE INVENTION

This application claims the priority of German patent document 101 28 136.6, filed Jun. 9, 2001, the disclosure of which is expressly incorporated by reference herein.

The present invention relates to a safety switch for preventing an unintentional vehicle battery discharge, for example, by external electric consuming devices connected to a vehicle socket, such as a cigarette lighter.

The unintentional discharge of a vehicle battery to a level at which the vehicle can no longer be started is a frequently occurring problem. Usually, the driver is at fault, because he has either forgotten to switch off the vehicle headlights, or to switch off or disconnect external consuming devices from vehicle sockets. For example, a cell phone charger may remain plugged into the cigarette lighter socket, or a vehicle refrigerator or ice box may not be disconnected from a specially provided socket (for example, in a van).

To solve this problem, it has been suggested to connect the vehicle sockets to the ignition so that, when the vehicle is parked or the ignition is "OFF", the voltage supply to the vehicle sockets is also interrupted. However, this solution is not without problems if, for example, sensitive medications are transported in a vehicle refrigerator, which are to be cooled for a certain time period even after the vehicle has been parked.

Even if, for this reason, a continuous voltage supply is maintained to the vehicle sockets, a plug-in site for an additional relay for the cigarette lighter must be provided in each vehicle since, for example, in Australia, due to the risk of fire, it is required that the socket for the cigarette lighter be connected to the ignition. This causes additional material costs and additional expenditures in vehicle production.

U.S. Pat. No. 5,691,619, discloses the use of a relay as an automatic safety switch, which disconnects all electric consuming devices (other than the starter) from the battery, if the voltage drops below a defined threshold value. However, this solution has the disadvantage that, because of the use of a relay, an excessively high quiescent current flows in the range of approximately 100 mA.

In U.S. Pat. No. 3,395,288, it is suggested that a Zener diode be used as a switch. However, because of their high current consumption, Zener diodes are also unsuitable for a use as such safety switches.

In view of the above, it is an object of the invention to provide an improved safety switch for preventing unintentional discharge of a vehicle battery.

This and other objects and advantages are achieved by the switch arrangement according to the invention, in which a semiconductor switch is used as the safety switch which disconnects the vehicle sockets from the vehicle battery, for example, as a function of time elapsed after the ignition is switched off, or as a function of the actual charging condition of the battery.

The use of a semiconductor switch as the safety switch according to the invention has the advantage that its wattless control requires no quiescent current, even in the switched-on condition. Another advantage of the safety switch according to the invention is that the need to provide a relay (required, for example, for Australia) can be eliminated in all vehicles. That is, when the safety switch according to the invention is used, the Australian requirement to disconnect the cigarette lighter socket from the voltage supply by way of the ignition will then be met by programming of an electronic control unit (which controls the safety switch) implemented, during or after the production of the vehicle.

In a preferred embodiment, the semiconductor safety switch according to the invention is adjusted to a continuous voltage supply (for example, for the connection of a refrigerator for medications) even after the ignition is switched off, by an individual programming of the corresponding vehicle control unit. Although in this preferred embodiment, responsibility for monitoring the battery condition is transferred to the driver, this rare individual need can be met by means of the same safety switch which, during the normal use according to the invention, prevents an unintentional discharging of the battery. That is, the use of the semiconductor switch according to the invention has the advantage that the same hardware is suitable for and adaptable to different needs, and such special cases need not be taken into account during the production of the vehicle (for example, by the installation of different hardware components); rather, they can be satisfied subsequently by reprogramming the control unit for the semiconductor safety switch.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic block diagram of the programmable semiconductor safety switching arrangement according to the invention.

DETAILED DESCRIPTION OF THE DRAWINGS

As depicted in the FIGURE, according to the invention, a semiconductor switch 1 is connected between the vehicle battery 2 and a socket 3, to which electric consuming devices 4 (such as, for example, a telephone charger or a portable refrigerator) are connectable. (Of course, the semiconductor switch may also be used to control the flow of current to electric consuming devices that are integral to the vehicle, in which case the socket 3 may be dispensed with.)

Operation of the semiconductor safety switch 1 is controlled by an electronic control unit 5, which is externally programmable via a serial interface 6. The electronic control unit may thus be programmed by the vehicle manufacturer during assembly of the vehicle, or subsequently by the vehicle dealer or owner.

The semiconductor safety switch according to the invention can also be used to monitor defects in the vehicle socket. For this purpose, the current consumption of the vehicle socket is monitored by the semiconductor, for example, by means of a SenseFET semiconductor. If the current consumption is too high (when, for example, an excessively large refrigerator is connected to the vehicle socket), or if current is consumed for a time period which is too long, the semiconductor is controlled correspondingly to interrupt the current supply to the socket. On the other hand, it is also possible to monitor the quiescent current consumed by the entire vehicle.

The safety switch according to the invention also has the purpose of facilitating charging the vehicle battery, for example, by way of the cigarette lighter, or of maintaining the existing charge. For this purpose, a semiconductor switch is used which operates with little through-switching voltage during a polarity inversion. The possibility of external charging of the vehicle battery is advantageous, for example, in showrooms or at automobile exhibits, where vehicle electric consuming devices (for example, the illumination) may be permanently in operation for an extended period of time, or may be constantly operated by the public (for example, electric window lifting mechanisms, electric seat adjustment, etc.). In these cases, recharging or maintaining the charge of the battery can be performed simply and discreetly by means of the semiconductor safety switch according to the invention, without the need of a charger connected directly to the terminals of the vehicle battery. Conventional safety switches do not permit such a bidirectional current flow (that is, current consumption by connected consuming devices, on the one hand, and charging current, on the other hand.

Various alternatives are provided for switching the semiconductor safety switch according to the invention into the "charge" embodiment. In a first alternative, the charge function is activated from outside the vehicle by way of a serial interface, the so-called diagnostic plug. In this manner, the electronic control unit controlling the semiconductor switch is correspondingly reprogrammed or the "charge" function is cleared. As a second alternative, an automatic detection takes place. When a voltage which exceeds a defined threshold value is applied, for example, to the output of the semiconductor safety switch or of the battery, the safety switch switches through and allows a current flow in the inverse direction and thus the charging of the battery. As a further alternative, the charging function is activated by an additional switch.

According to the invention, various alternatives are also provided for the termination of the "charge" condition. For example, in one embodiment, the switch-over takes place when the output voltage of the switch or of the battery falls below a preset value. Alternatively, the switch-over may occur when the battery charge falls below a first defined value (that is, the charger was withdrawn) or exceeds a second defined value (that is, the battery fully charged). As a further alternative, the switch-over may take place after a fixed time period. According to still another alternative, the additional switch is again changed into the "OFF" position. Finally, a switch-over may take place when no charging current into the battery is detected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed::

1. Apparatus for preventing unintentional discharge of a vehicle battery, said apparatus comprising:
   a semiconductor safety switch interruptibly coupling said battery to electric consuming devices on said vehicle; and
   a programmable control unit for opening and closing said semiconductor safety switch as a function of a monitored parameter; wherein,
   said semiconductor safety switch is connected to selectively supply or interrupt electric power from said battery to an electric socket of said vehicle, for coupling said electric power to said consuming devices;
   said semiconductor safety switch provides a bidirectional current flow capability, whereby said vehicle battery can be charged via the vehicle socket;
   said semiconductor safety switch is switchable between an operating state in which charging current is not allowed to flow to said battery, and an operating state in which charging current is allowed to flow to said battery;
   said semiconductor safety switch switches to said operating state in which a charging current is allowed to flow to said battery, in response to the application of a voltage to one of an output of said semiconductor safety switch and an output of said battery, which voltage exceeds a defined threshold value.

2. Apparatus for preventing unintentional discharge of a vehicle battery, said apparatus comprising:
   a semiconductor safety switch interruptibly coupling said battery to electric consuming devices on said vehicle; and
   a programmable control unit for opening and closing said semiconductor safety switch as a function of a monitored parameter; wherein,
   said semiconductor safety switch is connected to selectively supply or interrupt electric power from said battery to an electric socket of said vehicle, for coupling said electric power to said consuming devices;
   said semiconductor safety switch provides a bidirectional current flow capability, whereby said vehicle battery can be charged via the vehicle socket;
   said semiconductor safety switch is switchable between an operating state in which charging current is not allowed to flow to said battery, and an operating state in which charging current is allowed to flow to said battery; and
   said control unit is programmable via a serial interface to cause said semiconductor safety switch to switch to said operating state in which a charging current is allowed to flow to said battery, in response to an activation from outside said vehicle via said serial interface.

* * * * *